INVENTOR.
LAWRENCE A. SCHOTT

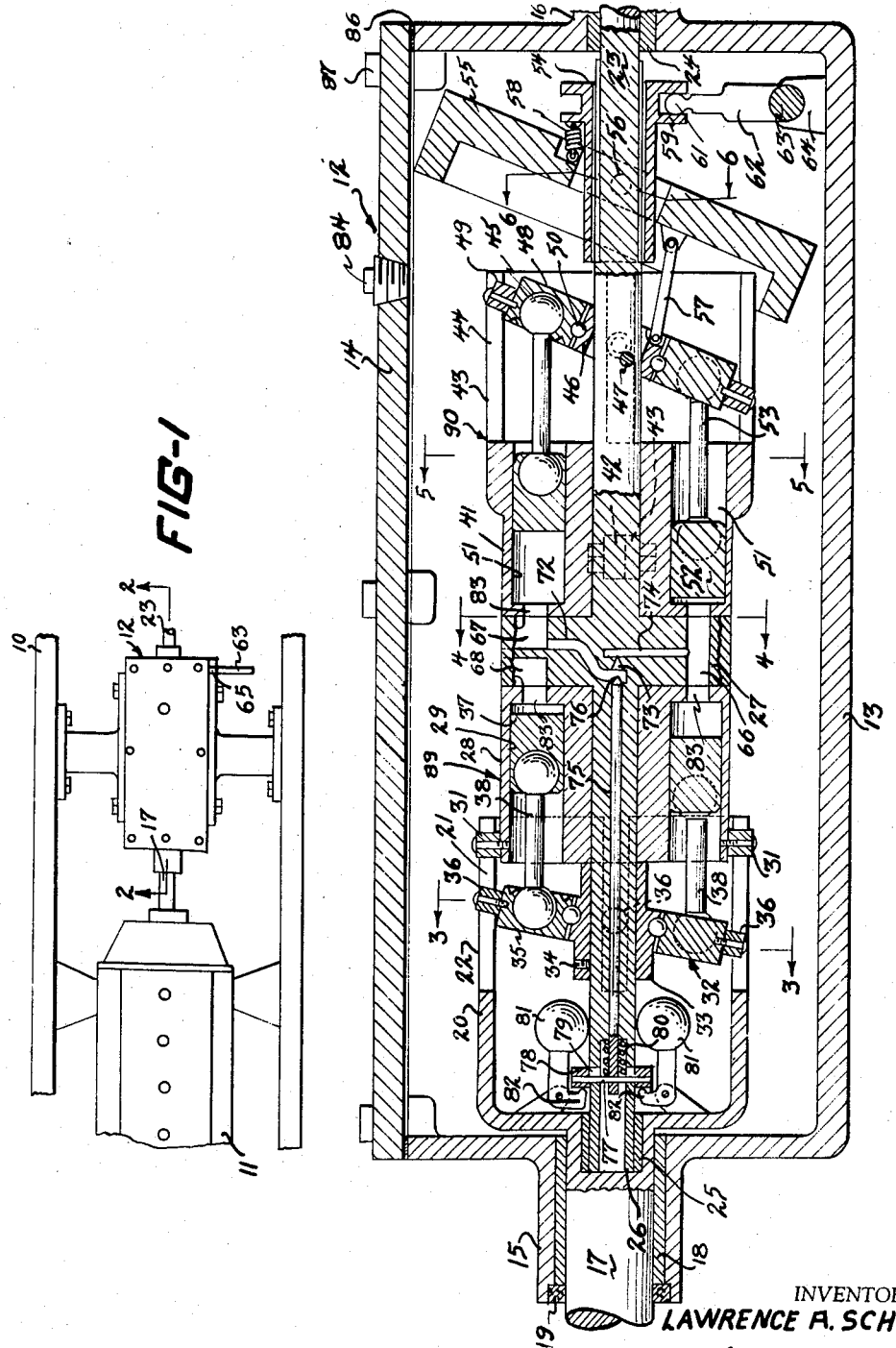

BY Toulmin & Toulmin
ATTORNEYS

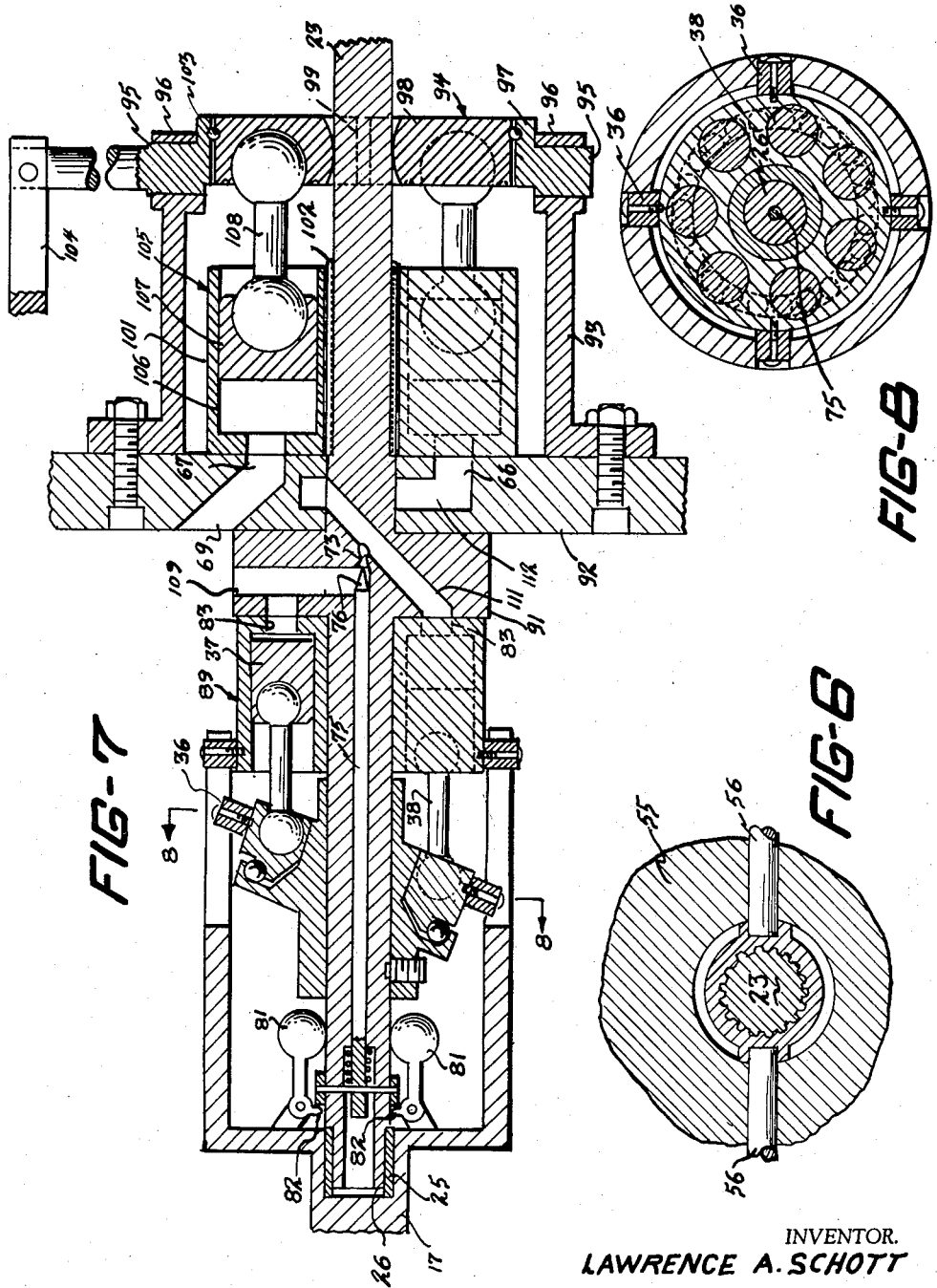

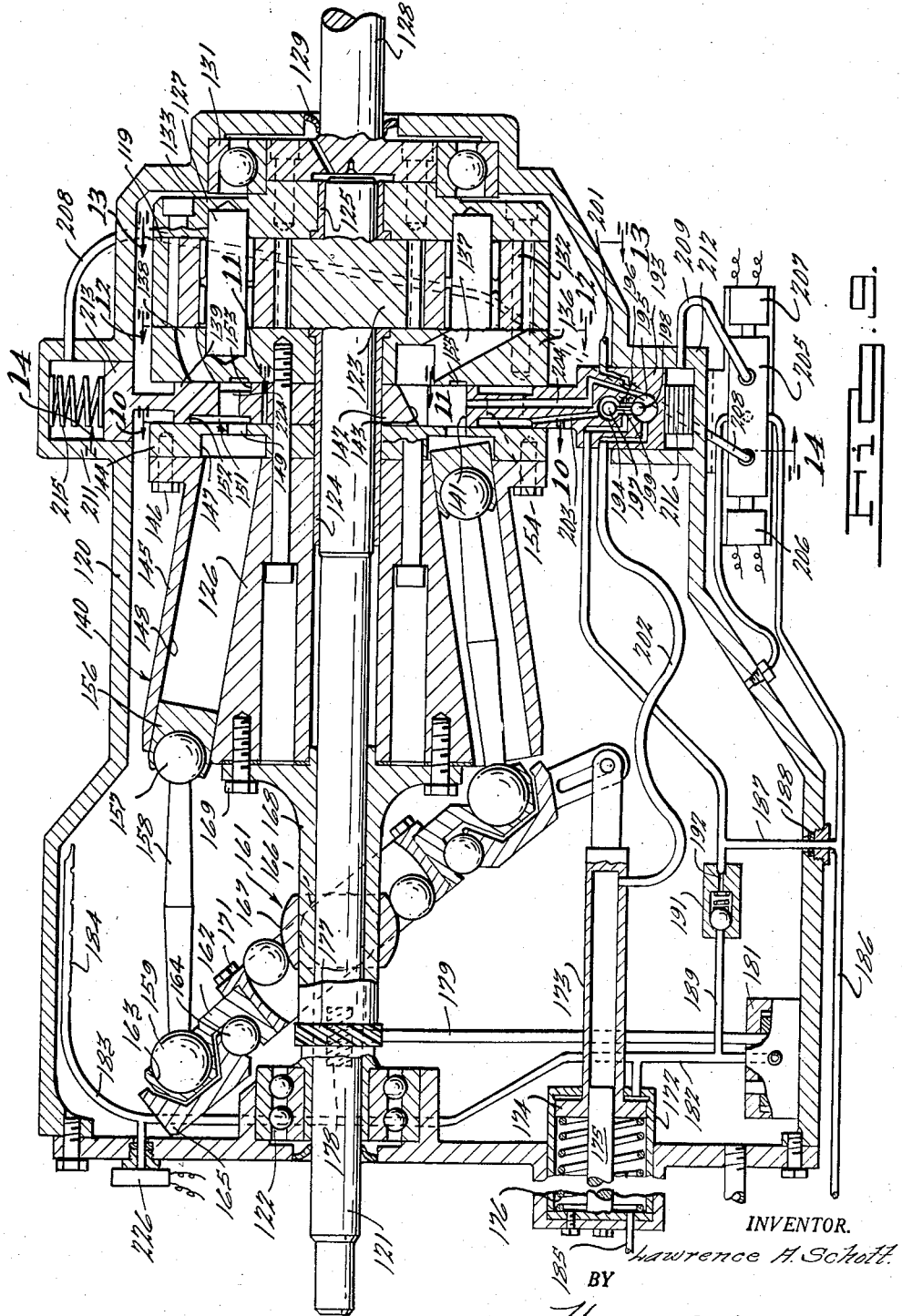

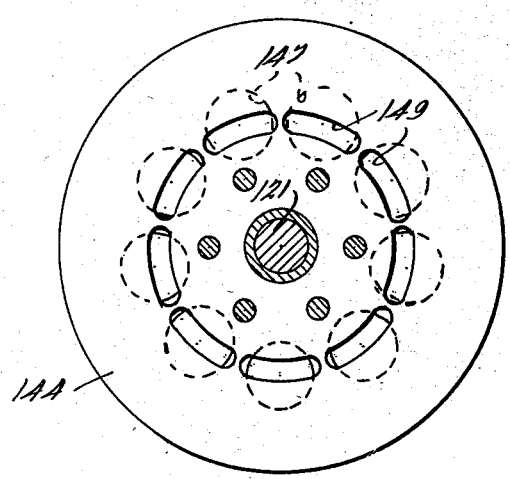
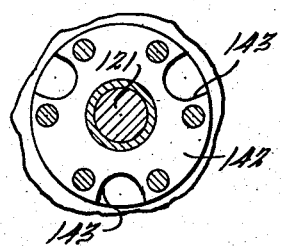
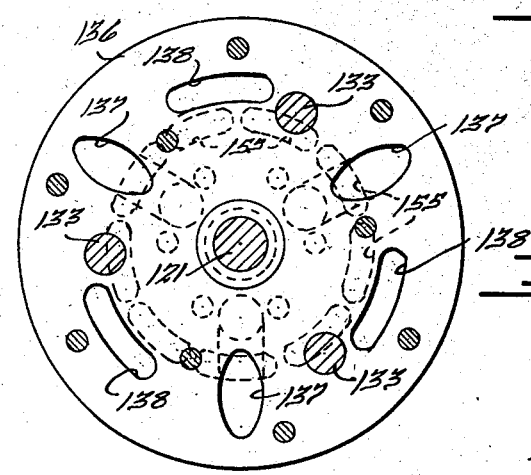

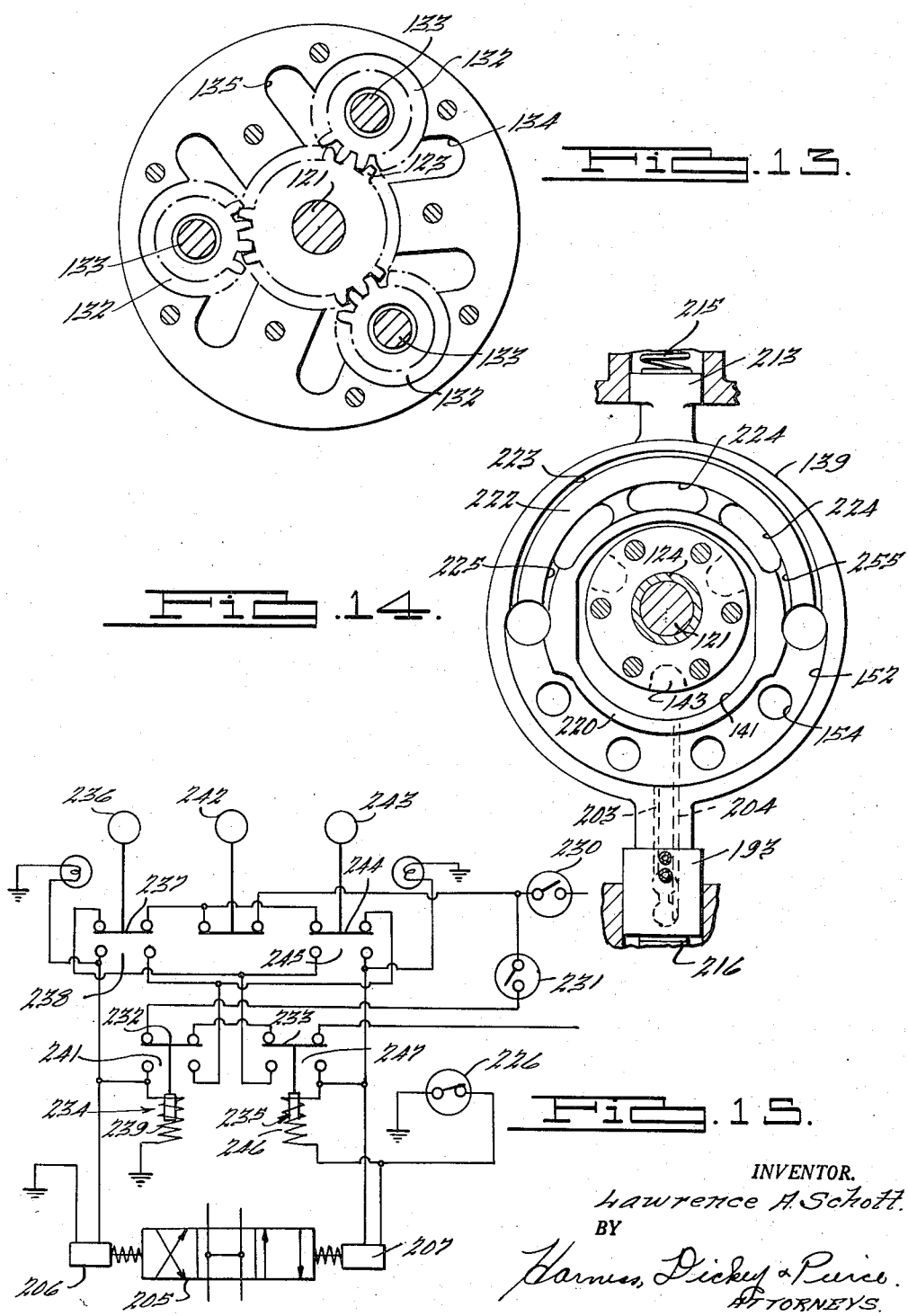

2,874,533

DIRECT DRIVE VARIABLE RATIO HYDRAULIC TRANSMISSION OF THE AUTOMATIC OR MANUAL TYPE

Lawrence A. Schott, Detroit, Mich.

Application November 18, 1954, Serial No. 469,782

6 Claims. (Cl. 60—19)

This invention relates to transmissions, and particularly to a transmission of the fluid type, and is a continuation-in-part of application Serial No. 187,434, filed September 29, 1950, now U. S. Patent No. 2,706,384.

The invention relates in particular to a hydraulic transmission which provides a variation of torque between the driving and driven shafts which varies from a maximum ratio to a direct drive without any feel of change of shift in the mechanism. The transmission is of such construction that as the torque requirement changes the speed and torque output changes and the resulting change occurs gradually and uniformly. As the torque requirement decreases and the speed increases, the difference in speed between the two shafts gradually decreases to zero and the shafts will move into coupled driving relation without any fluid flowing. The hydraulic part of the transmission is employed only to provide an increase of torque when additional torque is required, thereby eliminating a flow of fluid when the shafts are directly coupled, the fluid being employed only to that degree that a change of ratio of speed and torque has occurred between the drive and driven shafts.

This change will occur automatically if provisions are made for controlling the capacity of the variable volume fluid motor, or such change can be effected manually as torque requirements change. While the invention structurally may assume various forms, by way of example the invention embodies the use of a shaft driven from a source of power which operates the propulsion means of a pump. The reactance portion of the pump is secured to a driven shaft to which the propulsion means of a variable fluid motor is secured. In this relation of elements the body of the fluid motor is secured in fixed position, and fluid from the pump is delivered to the motor through a suitable porting member.

When no pumping can occur, the shafts are directly coupled, and when increased torque is required at the driven shaft this is obtained by increasing the motor capacity from zero to the degree required. This provision of increased motor capacity permits a change in speed between the shafts which produces a degree of pumping action which is relative to the change in speed between the shafts. The fluid from the pump is delivered to the motor to apply power to the porpulsion means thereof to assist in driving the shaft, thereby increasing the torque on the shaft.

The percentage of lag permitted to the driven shaft relative to the drive shaft is equal to the percentage of the capacity of the pump per turn which is provided. Thus, if 50% capacity is permitted to be delivered each rotation of the driving shaft, the driven shaft will be permitted to lag one-half turn or 50%, thus providing a 2 to 1 ratio between the shaft speeds. The fluid from the pump is directed to the motor which assists the pump in turning the driven shaft this one-half turn. It is to be understood that a fixed capacity pump may be utilized with a fixed capacity motor or a plurality thereof to provide a transmission having a fixed ratio and a direct couple drive if one motor is employed and a plurality of different fixed ratios and a direct couple drive if a plurality of motors are employed.

When the torque requirement decreases after the shafts have been operating at different speeds, the capacity of the motor may be decreased, and as the same amount of fluid from the pump cannot be supplied to the motor, the driven shaft speed will be increased and the degree of pumping will be decreased. When the variable capacity motor has been shifted to inoperative position, the pump can no longer pump and the drive and driven shafts will be operating in direct coupled relation. When the variable fluid pump is provided with torque control means for varying the requirement for fluid in proportion to the torque requirement, the change in relative speed of the drive and driven shafts will thereby occur automatically. When additional torque is required on the driven shaft slowing up the shafts, the capacity of the motor changes automatically and the pump wil operate to a degree proportionate to the difference of speed of the shafts. As the torque requirement is reduced, the speed of the shafts increases, the capacity of the fluid motor is decreased, and the relative pumping action also decreases so that the speed of the driven shaft will continue to build up until it is again directly coupled with the drive shaft.

Thus, it will be noted that the invention accomplishes a change of ratio between the driving and driven shafts through the control of hydraulic fluid. As the torque requirement increases, the ratio of rotation between the shafts increases, and as the torque requirement diminishes, the ratio decreases. In the example given, this automatic change is accomplished by centrifugal means, such as flywheels, governor balls and the like, or the change may be made manually, as pointed out hereinabove.

Another effect may be produced between the two shafts when the relationship between the propulsion means thereof is changed to cause the fluid motor to function as a pump and the pump to function as a fluid motor. This produces a flow of fluid from the motor to the pump which, functioning as a motor, causes the driven shaft to operate at increased speed but at reduced torque. This occurs when the capacity of the motor after having reached zero capacity has been moved to a reverse or pumping position which, up to a certain capacity, will drive the driven shaft faster than the driving shaft, thus acting as an overdrive. This overdrive effect can be built up until the capacity of the motor, acting in reverse, equals the capacity of the pump. When the capacity of the motor acting in reverse exceeds the capacity of the pump, a reversal of rotation of the driven shaft occurs relative to the direction of rotation of the driving shaft.

The ratio between the speed of the shafts, the overdrive and the reverse operation thereof can be illustrated as follows. If the capacity of the motor is adjusted to have five times the capacity of the pump, the pump will turn five times to supply fluid to produce one turn of the motor and one turn to keep up with the motor. Thus the ratio between the driving and driven shafts will be six to one. If the motor capacity is decreased to four times the capacity of the pump, the pump will turn four times to supply fluid to produce one turn of the motor and one turn to keep up with the motor. Thus the ratio will change to five to one. This relative relationship will continue until the capacity of the motor is zero, and as the pump need not turn to supply fluid it need only turn the one turn to keep up with the motor and the ratio is one to one, at which time the shafts are in direct coupled relation.

The operation of the motor in a reverse direction subtracts from the turn required of the pump to keep up with the motor and to this degree of difference will the driven shaft increase its speed over the input shaft. This overdrive effect can be continued to a point where the capacity of the reversed motor equals that of the pump which can be indicated at the point of infinity. Going beyond the indicated infinity point, the motor will be operated by the fluid from the pump in a reverse direction with a speed depending upon the set capacity of the motor in reverse. For example, if the motor is set to full capacity in reverse at say five times the capacity of the pump, the pump must relatively rotate five times to supply the required fluid to the motor to produce one turn of the motor. Actually the pump is required to rotate only four turns, as a turn is picked up by the counter operation of the shafts, thus producing a four to one reduction in ratio.

Initially upon starting the driving member at low speed, the system is so set that the fluid produced by the operation of the pump is by-passed to tank and no resistance is offered to pump operation. When the by-pass is shut off, the fluid builds up a pressure to a permissible amount, the reactance to which drives the shaft so that relative relationship exists between the pump revolution and shaft revolution relative to the rotation of the input shaft.

In a wobble plate type of motor, it is merely necessary to tilt the wobble plate in the opposite direction to that for direct drive to reverse the operation of the driven shaft. The volume of the motor must be larger, therefore, than the volume of the pump per revolution to cause the reversal of the propulsion means of the pump so that it will actually carry the reacting portion of the pump, and therefore the driven shaft, in a direction counter to the rotation of the input shaft.

The wobble plate on the fluid motor may be pivoted off-center relative to the driven shaft toward the side which produces thrust from the output pistons, which tends to force the wobble plate in a more angular position as the pressure increases on the piston. Thus, the ratio of supply and demand of fluid between the pump and motor tends to increase as the input torque increases, which is accomplished by increased throttle. The centrifugal force resulting from speed produced by the flywheel on the output shaft tends to straighten the wobble plate and in this manner tends to retain the driving and driven shafts in direct coupled relation. This condition may be balanced to any desired degree and will produce the effect of greater torque and increase of speed directly if more throttle is applied. When the throttle is increased, the increased power on the pistons of the fluid motor will cause its wobble plate to tilt due to the off-centered pivotal relation thereof and will counteract the flywheel which is tending to maintain the wobble plate in no-stroke position. Thus, the increase in throttle produces an increase in torque ratio which will be attempted to be overcome by the increase of centrifugal force in the flywheel. In an automobile, the increase in throttle produces an increase in torque which tends to produce an increase in speed. As the speed of the driven shaft increases, the centrifugal force of the flywheel overcomes the tilting force in the wobble plate, the wobble plate will be drawn to nonoperating position and thereby have no capacity. As a result, the pump can no longer pump fluid to the fluid motor and a lock occurs in the fluid system resulting from the fluid motor reaching no-volume capacity, and at this point the shafts are driven at the same speed directly without any fluid movement.

Accordingly, the main objects of the invention are: to provide a variable ratio hydraulic transmission which is directly coupled in such manner that it can be driven at high speed for long periods of time without developing any excess heat; to provide a transmission with a drive and driven shaft interlocked by a closed fluid system between a pump and motor when the shafts are driven at the same speed; to provide a transmission having a drive and driven shaft with a fluid system which is inoperative when the shafts are operating at the same speed and which is operative to produce a flow of fluid from the driven shaft to the drive shaft to increase the torque on the latter as the speed thereof decreases; to provide a transmission having a drive and driven shaft with a pump on the drive shaft and a variable capacity fluid motor on the driven shaft, the differential in speeds between the two shafts providing a proportional degree of operation of the pump which provides pressure to the fluid motor for increasing the torque on the driven shaft; to provide a transmission having a drive and driven shaft interconnected through a pump on the drive shaft and a variable capacity motor on the driven shaft, the capacity of the latter of which is controlled centrifugally to meet the torque requirements of the driven shaft when operating out of synchronism with the drive shaft; to provide a transmission having a drive and driven shaft interconnected through a pump and variable capacity motor, the operation of which increases with the increase in differential speed of operation between the shafts to provide increased torque to the driven shaft and which provides increased speed of the driven shaft over the drive shaft when the motor is in overdrive position and which produces a reversal of operation of the driven shaft when the fluid motor is in reverse position; and, in general, to provide a transmission which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

Figure 1 is a broken, plan view of an automotive vehicle having a transmission embodying features of the present invention;

Fig. 2 is an enlarged sectional view of the transmission illustrated in Fig. 1, taken on the line 2—2 thereof;

Fig. 6 is an enlarged sectional view of the structure illustrated in Fig. 2, taken on the line 6—6 thereof;

Fig. 7 is a view of structure, similar to that illustrated in Fig. 2, showing a further form which the invention may assume;

Fig. 8 is a sectional view of the structure illustrated in Fig. 7, taken on the line 8—8 thereof;

Fig. 9 is a sectional view of a device, similar to that illustrated in Fig. 1, showing a further form thereof;

Fig. 10 is a sectional view of the structure illustrated in Fig. 9, taken on the line 10—10 thereof;

Fig. 11 is a broken sectional view of the structure illustrated in Fig. 9, taken on the line 11—11 thereof;

Fig. 12 is a sectional view of the structure illustrated in Fig. 9, taken on the line 12—12 thereof;

Fig. 13 is a sectional view of the structure illustrated in Fig. 9, taken on the line 13—13 thereof;

Fig. 14 is a sectional view of the structure illustrated in Fig. 9, taken on the line 14—14 thereof, and Fig. 15 is a wiring diagram of the circuit for controlling the operation of the device illustrated in Fig. 9.

Figure 3:
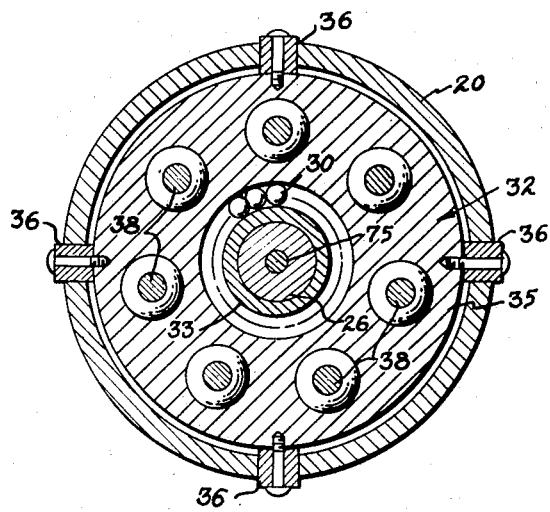
Fig. 3 is an enlarged sectional view of the structure illustrated in Fig. 2, taken on the line 3—3 thereof.
Figure 4:
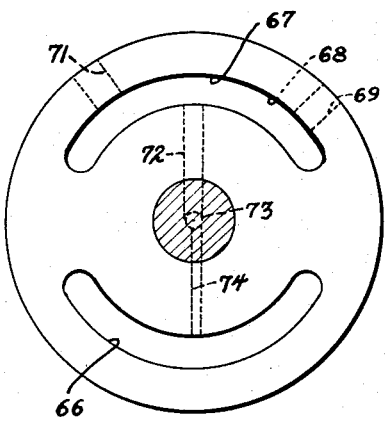
Fig. 4 is an enlarged sectional view of the structure illustrated in Fig. 2, taken on the line 4—4 thereof.
Figure 5:
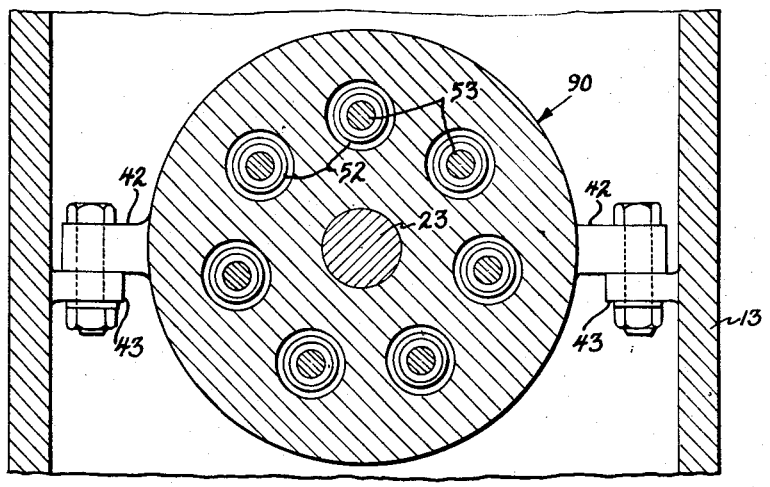
Fig. 5 is an enlarged sectional view of the structure illustrated in Fig. 2, taken on the line 5—5 thereof.

Referring to Figs. 1 to 6, the transmission of the present invention is illustrated in Fig. 1 as being applied to an automobile. It is to be understood that the application of the transmission to an automobile and the specific structure employed in the transmissions is illustrated by way of example, as the transmission may be employed for many other applications and the form thereof may vary substantially from that herein described. A chassis frame 10 is of the conventional type, having an engine 11 supported thereon for operating through the transmission 12 of the present invention.

The transmission 12, as illustrated in Figs. 2–6 inclusive, comprises a casing 13 having a removable cover 14 and bosses 15 and 16 at the opposite ends. A drive shaft 17 is journaled in a bearing 18 in the boss 15, sealed against the passage of fluid from the inside of the casing 13 by a sealing element 19. The shaft has a cuplike end 20 disposed within the casing, having four slots 21 in the cylindrical, inwardly extending wall 22 thereof. A driven shaft 23 is supported by bearings 24 in the boss 16 at the opposite end of the casing from the drive shaft 17 in alignment therewith. A bearing 25 is provided on the inner end of the drive shaft 17 in which the forward end 26 of the driven shaft 23 is supported. Medially of the ends of the shafts, a valve plate 27 is disposed in fixed relation with shaft 23.

The forward end of the drive shaft 23 supports a barrel 28 of a pump 89 mounted for rotation relative thereto. The barrel is provided with a plurality of cylinders 29 which are herein illustrated as being seven in number, but it is to be understood that any number of cylinders may be provided within the barrel. The barrel has four rollers 31 secured on the outer periphery thereof and each located within a slot 21 of the cup 20 on the drive shaft 17. A swash plate 32 is mounted on the forward end of the shaft 23, having an inner element 33 fixed to the shaft 23 by suitable means herein illustrated as by setscrews 34. The outer element 35 of the swash plate has four rollers 36 secured to the outer peripheral surface thereof, each located within a slot 21 of the cup 20. A piston 37 is mounted for reciprocation in each one of the cylinders 29 of the barrel 28, having ball-ended connecting rods 38 connected to the pistons 37 and the outer element 35 of the swash plate 32 in the conventional manner. The inner and outer elements 33 and 35 are connected in drive relation by balls 30 or other suitable means to transfer the reactive thrust of the pump to the shaft 23. The location of the rollers 31 and 36 within the slots 21 produces the synchronized rotation of the swash plate element 35 and the barrel 28 relative to the shaft 23.

A barrel 41 of a motor 90 is mounted for rotation on the rearward end of the shaft 23 on the opposite side of the valve plate 27 from that of the barrel 28. The barrel is secured by a pair of arms 42 to a boss 43 on each side of the casing 13. The barrel 41 has a cylindrical portion 43 extending therefrom, provided with four slots 44. The inner element 46 of the swash plate 45 is secured to the shaft 23 by a pivot 47 which may be located on the center of the shaft but which is herein illustrated as being disposed in off-center relation therewith, for a purpose to be hereinafter described. The outer element 48 of the swash plate 45 is provided with four rollers 49 on the outer peripheral face thereof which operate in a slot 44 of the cylindrical extension 43 of the barrel 41. The interconnection of the rollers 49 in the slots 44 retains the outer element 48 of the swash plate 45 from rotating so as to be maintained in alignment with the fixed barrel 41. The barrel 41 contains a plurality of cylinders 51, herein illustrated as being seven in number, although any number of cylinders may be utilized which may be of the same or greater capacity than the cylinders 29 of the barrel 28. Each of the cylinders contains a piston 52 which is interconnected by ball-ended connecting rods 53 to the element 48 of the swash plate 45 in the conventional manner. The inner and outer elements 46 and 48 are interconnected by balls 50 or other suitable means to be in driving relation to each other. Thus, it will be seen that the barrel 41 is retained in fixed relation to the casing and that the swash plate element 48 is retained in fixed relation to the barrel.

A sleeve 54 is splined to the rearward end of the shaft 23 for rotation therewith while being shiftable longitudinally thereon. A flywheel 55 is supported by trunnions 56 on the sleeve 54. A link 57 is pivoted to the flywheel and to the inner element 46 of the swash plate 45. A spring 58 interconnects the flywheel to the sleeve 54 diametrically opposite to the connection of the link 57 of the swash plate. A pair of flanges 59 extends outwardly from the sleeve 54, providing a channel in which a roller 61 extends, the roller being mounted on an operating arm 62 mounted on an operating shaft 63 which is journaled in apertures in bosses 64. The operating rod 63 extends through the casing and through a packing gland 65 in fluid tight relation therewith.

The valve plate 27 is provided with a fluid delivery passageway 66 on one half thereof and a fluid discharge passageway 67 and a fluid intake passageway 68 on the opposite half thereof. The fluid discharge slot 67 has a discharge aperture 69 and the fluid intake slot has an intake aperture 71, the apertures 69 and 71 communicating with the interior of the casing 13. The discharge slot 67 is connected by a by-pass passageway 72 to a valve seat 73 on the center line of the shaft 23. A by-pass passageway 74 interconnects the fluid delivery passageway 66 to the seat 73. A rod 75 extends through the forward end of the shaft having a valve end 76 which is movable into engagement with the valve seat 73. The rod has its forward end secured by a pin 77 to a collar 78 mounted exteriorly of the shaft 23. The pin 77 operates within a slot 79 through the walls of the shaft. A pair of flyweight ball governors 81 is mounted on the drive shaft 17 on the base of the cuplike element 20 thereof, having fingers 82 disposed in engagement with the collar 78 for moving the collar and the rod 75 toward the rear end of the shaft 23, thereby seating the end of the valve 76 on the seat 73 and cutting off the supply of oil from the delivery passageway 66 to the discharge passageway 67. A spring 80 about the rod 75 retains the valve end 76 unseated and the governor 81 inoperative. Each cylinder 29 of the barrel 28 and each cylinder 51 of the barrel 41 has a passageway 83 at the end thereof which is relatively movable into and out of engagement of the passageways 66, 67 and 68, respectively. A fill plug 84 is provided in the cover 14 of the casing so that the casing may be maintained full of fluid after the cover is secured in sealed relation with the casing 13 by the gasket 86 and the plurality of screws 87. The casing 13 is filled with a desirable fluid through the fill plug 84, and the transmission is then in condition for operation. For the purpose of illustration, the valve 27 is shown offset from normal position. The outward movement of the pistons 37 should occur at the end of the slot 67, not at the center thereof, as shown.

Assuming the transmission to be employed on an automobile, when the engine 11 is started, the spring 80 retains the flyballs in inoperative position at idling engine speed. When the speed of the engine 11 increases, the flyballs overcome the tension of the spring 80 and start to seat the valve end 76. When the valve end is unseated during the idling of the engine, the shaft 17 is rotating and the shaft 23 remains stationary. This permits the barrel 28 and wobble plate 32 to rotate relative to the shaft 23 and the wobble element 33, thereby producing a pumping operation conforming to the speed of the drive shaft 17. The pistons 37, when in pumping position, discharge the fluid from the passageway 83 into the passageway 66 where it passes into the by-pass passageway 74 through the valve seat 73 to the by-pass passageway 72 to the discharge passageway 67 and the discharge aperture 69. In this manner, when the engine is idling, the pump is operating at the speed of the drive shaft, but is producing no driving force to the automobile as the fluid is directly by-passed back into the case.

When the speed of the engine increases and the valve seat 73 is being closed by the valve 76 due to the operation of the centrifugal device 81, the reaction to the pump by the restriction to the flow of oil reacts on the driven shaft to produce its rotation. When the valve 76 reaches closed position, the fluid can no longer be by-passed and is directed from the passageway 83 of the pump to the passageway 66 of the valve into the passageway 83 of the motor. This produces a driving operation of the motor to an amount depending upon the degree of torque requirement on the shaft 23, and as the torque requirement decreases, the speed of rotation of the shaft 23 will pick up until it reaches the same speed as the drive shaft 17 and the shafts will operate in direct coupled relation. This occurs by reason of the fact that the pumping of the fluid into the motor provides a drive force to the shaft 23 by the motor, the reactance to which applies a force back through the pump, which also produces a driving relation on the shaft 23. As the speed of the shaft 23 increases, the centrifugal force of the flywheel 55 will reduce the capacity of the motor which will apply a further resistance to the operation of the pump, the reaction to which will further increase the speed of the shaft 23, and if the torque load permits the shaft 23 to continue to build up speed, the wobble plate 45 will be moved to neutral position so that the motor can no longer function, the pump can no longer pump and the two shafts will be operated at the same speed interlocked by the inability of the fluid to pass from the pump to the motor.

Should the torque requirement of the driven shaft thereafter increase, the operation of both shafts will slow down, the flywheel will tilt and shift the wobble plate of the motor to provide capacity thereto, and the pump will start operation to provide fluid to the motor as the driven shaft slows down. The fluid from the pump delivered to the motor adds torque to the shaft 23, and if the shaft should further slow down due to the reduction in centrifugal force in the flywheel, the flywheel will be shifted by the spring 58 and the wobble plate 45 of the motor will be further shifted to further increase the motor capacity, the speed of the pump will be increased to supply fluid to the motor, which will add additional torque to the shaft 23 until a balanced condition is reached.

When the torque requirement on the shaft 23 is reduced, the speed of both shafts increases, increasing the centrifugal force of the flywheel 55 which operates to decrease the capacity of the motor, thereby forcing the fluid being pumped to react on the driven shaft to increase its speed, and as the speed of the driven shaft continues to increase as the torque requirement decreases, it will again become directly coupled with the drive shaft 17.

When a reverse operation of the shaft 23 is desired, the operating rod 63 is actuated to move the arm 62 and shift the sleeve 54 toward the rear end of the shaft 23, thereby reversing the slope of the wobble plate 45 and thereby reversing the action of the motor 90 when the capacity of the motor 90 is greater than that of the pump to cause the shaft 23 to operate in a reverse direction. In between the neutral position of the wobble plate 45 and its reverse position, an overdrive position obtains in a manner as pointed out hereinabove. The action above described occurs when the wobble plate element 45 is pivoted to the shaft 23 on the center line or when pivoted off-center thereof, as illustrated. When in off-center relation, an advantage is provided in that when the speed of the engine 11 is increased the increased supply of fluid from the pump 89 produces increased thrust on the piston of the motor 90 and the differential between the length of arm of the wobble plate element 46 and each side of the center of the shaft 23 tends to shift the wobble plate into a greater angular position and thereby apply an additional torque to the shaft 23. The flywheel tends to counterbalance the tilting effect produced on the wobble plate due to the increased speed of the shaft 23, thereby tending to bring the wobble plate to neutral position and the shafts in direct coupled relation. Thus, a greater torque can be applied to the shaft 23 through increasing the speed of the engine; that is to say, the same speed of driving of the automobile will be obtained by increasing the speed of the engine which will produce an increased speed of the drive shaft 17 over the shaft 23 and start operation of the pump 89 and the motor 90 until the torque requirement is overcome, at which time the engine speed can be reduced to have the shafts again run at the same speed or the shaft 23 will pick up additional speed to operate the automobile faster when the shafts are again running at the same speed due to the decrease of torque requirement.

Referring to Fig. 7, a different arrangement of the parts of the motor and pump is illustrated to show the possibility of employing different constructions, not only when utilizing the wobble type of pump and motor, but it is to be understood that different types of pump and motor may be employed and advantages provided thereby. In the illustrated construction, the fluid pump 89 is substantially the same as that illustrated in Figs. 2 to 6. A portion of a valve plate 91 is mounted to the driven shaft 23, the other part 92 thereof being fixed to the casing 13 (not shown in Fig. 7). A cylindrical bracket 93 extends rearwardly from the plate 92 and is utilized for supporting a wobble plate 94 thereon by a pair of trunnions 95 which are journaled in bearings 96 on the element 93. The trunnions are secured to the outer element 97 of the wobble plate 94, the inner element 98 of which is secured to the shaft 23 by a key 99, a universal joint or other connection which provides a drive connection therebetween while permitting the element 98 to rock relative to the shaft 23. A barrel 101 is secured to the shaft 23 by splines 102, so that the barrel and the element 98 of the swash plate rotate in synchronism with each other and the shaft 23. The elements 97 and 98 of the swash plate are interconnected by a plurality of ball bearings 103 or other mechanism strong enough to withstand the strain of operation. Suitable mechanism, herein illustrated as a lever 104, is employed for tilting the swash plate 94 to thereby vary the capacity of the motor 105 which embodies the barrel 101 and swash plate 94.

The barrel 101 contains a plurality of cylinders 106 in which reciprocating pistons 107 are mounted and connected by ball-ended connecting rods 108 to the swash plate element 98. The passageways 83 from the pump 89 communicate with an inlet passageway 109 on the intake side of the pump and with the discharge passageway 111 on the pressure side of the pump. The bypassing of fluid from the passageways 111 to the passageway 109 is cut off when the valve end 76 is seated on the valve seat 73. Thereafter, delivered fluid from the passageway 111 enters a cylindrical passageway 112 in the valve plate 92 from which it is delivered to a valve passageway 66 and the motor 105 from which it is discharged into the valve passageway 67 and exhausted from the discharge passageway 69 into the casing 13, not shown.

The structure illustrated in Figs. 7 and 8 operates in the same manner as the structure illustrated in Figs. 1–6, and is herein illustrated and described for the purpose of showing the use of different capacities of motors and pumps and the different arrangement of the parts. It will be noted that the barrel 101 and the inner element 98 in the wobble plate 94 rotate with the shaft 23, and that the valve plate part 92 is fixed to the casing 13. It has been pointed out hereinabove that the parts of the pump and motor may be of any form that is suitable and that the connection may be made to the shafts in any desirable manner, just so that the shafts can be directly coupled when no fluid is flowing and when fluid is flowing during the time the shafts are operating at different speeds, the fluid is utilized for applying torque to the driven shaft. The greater capacity of the motor over the capacity of the pump was found to be necessary to reverse the direction of operation of the driven shaft relative to the drive shaft when the direction of operation of the motor is reversed. It is to be understood that in the construction illustrated in Figs. 1–6, the capacity of the motor and pump may be changed, one relative to the other, to meet the specific requirement of output speed and torque.

Referring to Figs. 9 to 15, a further form of transmission device is illustrated that which resulted from continuous development of the originally shown structure. A case 120 is secured in fixed position in the vehicle or on a base of a machine on which the transmission is employed. A shaft 121, which is connected to the power source, is supported on the forward end of the case in a bearing 122. The opposite end of the shaft supports a drive gear 123 of a pump 119. Forwardly of the drive gear 123 a sleeve bearing 124 and rearwardly of the drive gear a sleeve bearing 125 support the shaft within the motor casing 126 and the pump casing 127, both of which rotate within the case 120 with or relative to the shaft 121. The pump casing has a driven shaft 128 extending therefrom rearwardly of the casing and sealed thereto by a suitable seal 129. The rear end of the pump casing is supported within the rear end of the case 120 by a bearing 131. Within the pump casing a plurality of driven gears 132 are mounted on stub shafts 133, and while any number of gears may be provided, in the present arrangement as illustrated in Fig. 13, three gears are employed. Each gear 132 has an intake port 134 and an outlet port 135 communicating therewith. A plate 136 contains three passageways 137 which communicate with the outlet port 135 of the pump and three passageways 138 which communicate with the inlet port 134 of the pump.

Between the motor casing 126 and the pump casing 127 a slidable valve plate 139 is mounted. The valve plate has a central opening 141 into which the high pressure fluid from the outlet passageways 137 of the pump are discharged. Centrally about the sleeve 124 on the shaft 121 a circular plate 142 is mounted for rotation with the motor casing 126. The circular plate contains three notched passageways 143 which are aligned with the outlet passageways 137 of the pump. A motor port plate 144 is secured to the cylinder body 145 of the motor 140 by a plurality of screws 146. The plate has circular recesses 147 therein, one for each of the cylinders 148 in the cylinder body and each recess communicates with an elongated slot 149 in the opposite face of the plate which communicates with the high pressure opening 141 in the center of the shiftable plate 139 or with the low pressure area 151 within the ring body. This low pressure area is provided by annular slots 152 and 153 on opposite sides of the ring body which communicate with each other through apertures 154. The slot 152 receives the oil discharged from the slots 149 in the plate 144 when communicating therewith, which oil passes into the slot 153 through the apertures 154 and then into the intake port 138 of the pump 119. Within the face of the plate 136 of the pump, aligned with the slots 149 in the plate 144, a plurality of slots 155 are provided of the same shape and area as the slots 149. The slots 155 balance the pressure on the plate 139 and permit the passage of fluid from the high to the low side of the pump when the plate 139 is in neutral position.

As indicated above, the cylinder body 145 has a plurality of cylinders 148 provided therein, herein illustrated as nine in number. Each of the cylinders contains a piston 156 having a universal ball type connection 157 with a piston rod 158, the opposite end of which contains a ball 159. It will be noted that the cylinders are disposed at an angle to the drive shaft 121 to obtain a greater length of stroke while concentrating the pressures at the ends of the cylinder as close as possible to the center of the shaft 121 to reduce the application of pressure, and the tendency to deflect the plate 144 which would bind the shiftable plate 139. A swash plate control mechanism 161 embodies an outer ring 162 having a plurality of ball recesses 163 therein for receiving the balls 159 on the ends of the piston rods 158. The ring 162 is supported by balls 164 on a trunnion ring 165 which has a pair of trunnions 166 thereon supported on needle bearings to the fixed case 120. A universal driving joint 167 is secured to the sleeve 168 on the forward end of the cylinder body 145 by screws 169. The universal joint is secured to the ring 162 by a plurality of screws 171. The universal joint is of the standard driving type such as that used for driving the propeller shaft of an automotive vehicle, the one herein illustrated being the Rzeppa type of joint.

For shifting the angularity of the swash plate 161, a control cylinder 172 is provided mounted in the forward end of the case 120 having a hollow piston rod 173 supporting a piston 174 within the cylinder. The hollow piston rod 173 functions as a cylinder when disposed in relation to a rod 175 extending therein from the center of the body of the cylinder. A spring 176 within the cylinder urges the piston 174 to the rear end thereof. A driven gear 177 is mounted on the sleeve 168 for driving a pump shaft 179. The shaft drives a pair of pump gears within a pump 181 which is immersed in the oil within the bottom of the case. A pressure line 182 from the pump 181 is connected to the rear end of the cylinder 172 in position to urge the piston 174 to the forward end thereof. This pressure is accurately controlled by the use of a conduit 183 which extends to the top of the case 120 and projects rearwardly therealong. The conduit has spray apertures 184 therein of a size to control the pressure delivered from the conduit portion 182. The oil spray besides controlling the pressure cools and lubricates the driven parts of the pump 119 and motor 140.

A conduit 185 at the forward end of the cylinder 172 is connected to the intake manifold of the engine for varying the pressure within the cylinder conforming to the engine operation. A conduit 186 on the outside of the case 120 extends from the lubrication pump of the engine and passes into the case 120 through the conduit 187 which is sealed to the case 120 by a packing gland 188. A conduit 189 extends from the conduit 182 through a check valve 191 to the conduit 187 which contains an accurately gauged orifice 192 for controlling the amount of fluid delivered to the conduit 187, to thereby permit pressure to be built up in the conduits 182 and 183. This check valve arrangement is desirable for providing pressure when the engine is stalled and the car is to be pushed to start the engine. This arrangement provides pressure for shifting the plate 139 out of its neutral position so that a drive will be had through the transmission to the engine.

The plate 139 has a piston 193 containing oil reservoirs 194 and 195 which communicate with each other through a passageway 196. A pair of balls 197 and 198 are interconnected by a rod 199 to form a unit valve assembly. These balls will be shifted to engage one or the other mouths of the passageway 196 for sealing off one of the reservoirs relative to the other.

The conduit 187 is connected into the passageway 196 and a conduit 201 extends from the passageway 196 and is provided with an orifice for the discharge of the fluid at an accurate predetermined rate, thereby controlling the pressure of the oil within the passageway. A flexible conduit 202 connects the reservoir 195 to the interior of the hollow piston rod 173 of the cylinder 172. A passageway 203 connects the low pressure area of the plate 139 to the reservoir 194 and a passageway 204 connects the high pressure area of the plate 139 to the reservoir 195. This fluid control device in the piston 193 is employed for providing fluid to both sides of the pump 119 so that fluid will always be available in all parts of the transmission.

As illustrated in Fig. 9, the high pressure fluid in the passageway 204 has closed the reservoir 195, thereby permitting fluid from the conduit 187 to pass from the passageway 203 into the low pressure side of the plate 139 and high pressure to be delivered to the hollow piston rod 173. When the operator's foot is removed from the accelerator, the pressure immediately reverses so that the high pressure will be on the lower side of the plate, thereby shifting the balls 197 and 198 to a reverse position so that the fluid from the conduit 187 will pass into the pump 119 and motor 140 through the conduit 204 and the pressure to the hollow piston rod drops to the orifice pressure of the conduit 201, permitting the rod to shift the swash plate of the motor to no-stroke position so that a one-to-one ratio is provided between the shafts 121 and 128.

The conduit 186 is connected into a four-way valve 205, having solenoids 206 and 207 at opposite ends thereof for shifting a spool which controls the flow of fluid either from the conduit 208 or 209. The valve is of the Vickers type, Model DG454–020C. The plate 139 is shifted in a plane through the trunnions 166 of the swash plate. While the figure shows the plate as being movable vertically, actually it is disposed 90° from the position shown in the figure to operate in a horizontal plane. A pair of cylinders 211 and 212 are provided in the walls of the fixed casing 120. The piston 193 and the piston 213 on the plate register within the respective cylinders 211 and 212. The cylinders center the pistons and the plate relative to the center line of the pump and the motor. Springs 215 and 216 are disposed within the cylinders 211 and 212 respectively for maintaining the plate in centered relation relative to the shaft 121. The springs are of like characteristics but since the plate is shown as being shifted it will be noted that one spring is shown compressed. The conduit 208 is connected to the cylinder 211 while a conduit 209 is connected to the cylinder 212. The valve 205 is employed for shifting the plate 139 from neutral position to forward or reverse positions so that the vehicle may be driven in either the forward or reverse direction.

When the operator is ready to drive the car, he first turns on the ignition key and starts the engine. The forward button is then pressed if he desires the car to move forwardly, or if he desires to back up then the reverse button is pressed. Upon pressing the forward button, the valve 205 shifts from neutral to forward position, applying fluid to one of the cylinders 211 or 212 which at idling engine speed is not sufficient to shift the plate 139. At this time the swash plate will be in its maximum angular position due to the action of the spring 176 which overcomes any vacuum from the conduit 185. When the operator desires to drive the vehicle, the accelerator is advanced, speeding up the engine and increasing the oil pressure in the conduit 186 which is delivered to one or the other of the cylinders 211 or 212, to thereby shift the plate 139. It is to be understood that when the engine is started the shaft 121 is driven, driving the pump gears 123 and 132 without building any substantial pressure within the system when the plate 139 is in neutral position. The flow of fluid will pass from the outlet passageways 137 about the plate 139 through the recess 144 into the intake passageways 138 of the plate 136 of the pump, thus freely circulating the oil within the system. It will be noted that the inner wall 220 of the plate 139 is of narrower width than the width of the recesses 155, permitting the circulation of oil when the plate is in neutral position. When the plate is shifted, the free flow of oil is interrupted and the high pressure oil is delivered to the cylinder 148 of the motor 140 when at one area of the plate during the rotation of the motor relative thereto and delivered therefrom into the intake passageways to the pump 119 at the opposite area of the plate 139.

From Fig. 14 it will be noted that the fluid from the pump 119 is always delivered within the central opening 141 and that the return oil passes into the recesses 152, 153 and apertures 151 to the intake passageway 138 of the pump. It will be noted further from Fig. 14 that one-half of one side of the plate 139 has a face 222 which is disposed in sealed relation to the face of the plate 136. The face 222 cuts off one of the three inlet passageways 138 at all times during the relative rotation between the pump and the plate 139 when the plate is shifted to a position for reversing the drive of the shaft 128. When in this position the fluid from the pump 119 to the motor 140 is applied on the opposite side from that when the vehicle is driven in a forward direction, thereby applying the torque in reverse direction from the shaft 121 to shaft 128 and thereby reversing the direction of operation of the vehicle. The capacity of the pump 119 is such as to deliver fifteen cubic inches of fluid each revolution of the central gear 123 relative to the pump housing 127. The motor 140 has a capacity for consuming forty-five cubic inches of fluid during a single rotation of the swash plate 162 relative to the trunnion ring 165 when the swash plate is at maximum angular position. The maximum difference in rotation between the shafts 121 and 128 will be the rate of consumption of oil by the motor to that delivered by the pump plus one, which gives a maximum ratio of four to one. It is understood that the ratio will vary from one to one to four to one, depending upon the angular position of the swash plate 162. When the plate 139 is in a position to reverse the drive of the vehicle, the ratio between the shafts 121 and 128 will be the capacity of consumption of the motor divided by the capacity of the pump less one, and in this instance would be two to one. It is for this reason that the face 222 is provided to the plate 139 so that the face will be in a position to cut out one of the three intake passageways 138 when the plate 139 is set for reversing the drive for the vehicle. This changes the capacity of the fluid delivered by the pump from fifteen cubic inches per relative revolution to ten cubic inches per relative revolution, thereby producing a ratio of substantially 3½ to 1 in reverse.

It will be noted that a passageway 223 is provided in the face 222 of the plate 139 for the purpose of supplying oil to the passageways 224 when a suction occurs in the passageways 138 if sufficient oil is not supplied from the cylinders 148. The oil in the slot 223 prevents air from being sucked into the pump and mixed with the oil, providing a mixture which would be compressible. The slot is effective only during reverse operation of the vehicle when the plate 139 is in reverse position. Slots 225 are provided in the face 222 of the plate 139 to permit the free flow of oil from one area of the plate to the other, thereby equalizing the flow of oil in the plate before it is delivered to the pump 119.

The tilted position of the swash plate 162 controls the amount of oil that can be consumed by the cylinders of the motor 140. When the swash plate is in vertical or no-stroke position, then no oil can be consumed by the cylinders and a head of oil under pressure will be provided by the pump due to the tendency of the gear 123 to drive the gears 132 and the pump body 136. In this relationship, a direct drive will occur from the engine to the shafts 121 and 128.

When starting from stop position, the swash plate 162 is at its greatest angular position and the plate 139 is shifted to a position for delivering oil to the motor cylinders in one area of the plate and for discharging oil from the cylinders at an opposite area of the plate to return the fluid to the adjacent intake passageways 138 of the pump 119. This will give a four to one ratio and the greatest degree of torque at the time of starting the forward movement of the vehicle. As the vehicle moves forward, the gears 177 and 178 drive the shaft 179 and the pump 181. The fluid pressure built up by the pump 181 in the conduit 182 will reach a desired amount and will apply a pressure to the rear side of the piston 174, tending to move it to the forward end of the cylinder 172 against a maximum pressure applied to the interior of the piston rod 173. The greater area of the piston 174 will overcome the pressure on the rod 175, thereby permitting the piston 174 to move toward the forward end of the cylinder. This will occur when the speed of the shaft 128 has increased a sufficient amount to drive the pump 181 at a higher speed, thereby increasing the oil pressure on the rear of the piston 174. The speed requirement of the shaft 128 to produce the necessary oil pressure on the back of the piston 174 to shift the piston is dependent upon the amount of pressure which is applied to the hollow piston 173. As the torque requirement of the wheels of the vehicle increases, the pressure of oil delivered to the cylinders 148 increases, thereby building up pressure in the hollow piston 173, tending to move it outwardly against the pressure on the rear of the piston 174. As the torque requirement increases, the piston 174 will move to the rear of the cylinder 172, permitting the swash plate 162 to move from a vertical position or from an angular position to a greater angular position, as the case may be, thereby increasing the mechanical advantage of the motor 140 and its oil consumption and thereby providing a lower ratio between the shafts 121 and 128. If constant speed of travel of the vehicle is desired when the tractive load increases, it is necessary to increase the speed of the engine. If the engine speed remains constant, the vehicle will be driven at a lower speed. However, torque will be applied from the motor 140 to the shaft 128, thereby increasing the driving torque on the wheels while reducing the drop in speed. It is to be understood that the speed of the engine may be changed to maintain the speed of the vehicle constant while the additional torque is being applied through the operation of the gears of the pump 119 relative to the case, supplying oil to the cylinders of the motor 140 to operate the pistons thereon, the length of stroke of which is dependent upon a balance between the torque requirement and the driving speed of the vehicle.

It will be noted from Fig. 9 that the conduit 185 connected to the cylinder 172 on the forward side of the piston 174 is available to assist in urging the swash plate 162 to its vertical or no-stroke position. It will be understood that if the vacuum is decreased due to inefficient engine operation, then this tendency is reduced, making it easier to shift the swash plate from vertical or no-stroke position, thereby lowering the ratio of the drive. It will be noted that the conduit 183 has a fluid pressure operated switch 226 connected therein which is connected to the control circuit in such manner as to prevent the plate 139 from being shifted to reverse position so long as the pump 181 is being driven at sufficient speed to maintain a desired pressure of oil within the conduit.

Referring to the wiring diagram of Fig. 15, when the ignition switch 230 is closed, the starter switch 231 may then be closed through a circuit to the starter through the contacts 232 and 233 of the forward relay 234 and the reverse relay 235, respectively. When the forward button 236 is shifted, contacts 237 are open and contacts 238 are closed. This completes a circuit to the solenoid 206 for shifting the valve 205, to thereby shift the plate 139 to a position for moving the vehicle forwardly. The closing of the contacts 238 energizes the coil 239 of the relay 234, thereby opening the contacts 232 and closing the contacts 241. This provides a holding circuit across the contacts 238 which will open upon the release of the button 236. The plate 139 may be returned to neutral position at any time upon pressing the neutral button 242 or turning the ignition switch 230 to off position, thereby opening the circuit to the coil 239 of the relay 234 and returning the contacts to the position illustrated in the drawing. If the motor dies during operation and the ignition switch is closed, the closing of the starter switch will not energize the starter motor so long as either of the coils of the relays 234 or 235 is energized. This is due to the fact that the contacts 232 and 233 are in open position.

The switch 226 is normally closed but when pressure is present in the conduit 183 these contacts open, thereby opening the ground to the relay 235 and the solenoid 207 which prevents the plate 139 from shifting to reverse position. If the reverse button 243 is pressed, either when the system is in neutral position or when in forward position when the contacts 226 are closed, the contacts 244 are opened and contacts 245 are closed, thereby energizing the coil 246 of the relay 235 and also the solenoid 207 and opening a circuit to the forward relay 234 by opening the contacts 233 and closing contacts 247. The energization of the solenoid 207 shifts the spool of the valve 205 so that the plate 139 is shifted to the reverse position pointed out hereinabove. When in this position, the pump gears will operate to produce pressure which will be applied to the cylinders of the motor 140 approximately 180° from the application of fluid pressure when the plate was in forward position, to thereby reverse the direction of application of the torque from the shaft 121 to shaft 128, to thereby reverse the direction of movement of the vehicle. It is to be understood that when reversing the vehicle the swash plate must be maintained in its maximum angular position so that a drive will occur between the fluid from the pump 119 to that of the cylinders and pistons of the motor 140. It is only through the drive of the motor casing and the pump casing in a reverse direction that a torque in the reverse direction is produced to the vehicle wheels. The swash plate 162 is retained at its maximum position due to the fact that the pump 181 is being driven in a reverse direction, eliminating any pressure to the cylinder 172 while a maximum pressure is being applied to the hollow interior of the piston rod 173 to urge the piston rod to the right, assisted by the spring 176. It is to be understood, therefore, that the reversal can occur only when a drive exists between the pump 119 and the motor 140. Thus, it will be seen that by driving the shaft 121 in the same direction as when driving the vehicle forwardly, the change in the flow of fluid from the pump 119 to the motor 140 when the plate 139 is shifted to reverse position produces the opposite rotation of the shaft 128. This occurs because the plate 139 has been shifted to have the pressure applied to the pistons of the motor at a point 180° from the point where the pressure was delivered when driving the vehicle forwardly. When the oil is delivered to the pistons in this manner, the reverse rotation of the swash plate 162 occurs, which thereby reverses the rotation of the motor casing. Sufficient mechanical advantage or force is provided to reverse the direction of rotation of the pump casing to which the shaft 128 is directly connected, to thereby produce the reverse rotation of the shaft 128 and the movement of the vehicle in a reverse direction.

It will be understood that the specific capacities of the pump 119 and motor 140 were herein referred to merely by way of example and are in no way limiting, as the rate of delivery of either the pump or motor or both may be changed to meet the requirement of a specific installation, that of a vehicle or of an industrial application.

What is claimed is:

1. In a variable ratio hydraulic transmission of the character described, a drive shaft, a driven shaft disposed in aligned relation to said drive shaft, a fixed capacity pump having an inlet and an outlet and comprising first and second relatively rotatable elements one being secured to said drive shaft the other secured to said driven shaft, a variable capacity fluid motor having first and second relatively movable elements disposed about said drive shaft and driven by the fluid pressure developed by said pump, means interconnecting the driven means of said fluid motor to said driven shaft for driving the shaft in the same direction as said shaft is driven by the pump, and means for reversing the flow of fluid from the pump to said motor when said fluid motor is set for full capacity to thereby reverse the rotation of said motor and the movable element of the pump which is secured to said driven shaft to thereby reverse the rotation of said driven shaft, said fluid motor being responsive to the pressure of the fluid at the outlet of said pump.

2. In a transmission, a drive shaft, a driven shaft disposed in aligned relation to said drive shaft, a fixed capacity pump having an inlet and an outlet and comprising first and second relatively rotatable elements one being secured to said drive shaft the other secured to said driven shaft, a variable capacity fluid motor having first and second relatively movable elements disposed about said drive shaft and driven by the fluid pressure developed by said pump, means interconnecting the driven means of said fluid motor to said driven shaft for driving the shaft in the same direction as said shaft is driven by the pump, means for reversing the flow of fluid from the pump to said motor when said fluid motor is set for full capacity to thereby reverse the rotation of said motor and the movable element of the pump which is secured to said driven shaft to thereby reverse the rotation of said driven shaft, said fluid motor being responsive to the pressure of the fluid at the outlet of said pump.

3. In a transmission, a drive shaft, a driven shaft disposed in aligned relation to said drive shaft, a fixed capacity pump having an inlet and an outlet and comprising first and second relatively rotatable elements, one being secured to said drive shaft, the other secured to said driven shaft, a variable capacity fluid motor having first and second relatively movable elements disposed about said drive shaft and driven by the fluid pressure developed by said pump, means interconnecting the driven means of said fluid motor to said driven shaft for driving the shaft in the same direction as said shaft is driven by the pump, means for reversing the flow of fluid from the pump to said motor when said fluid motor is set for full capacity to thereby reverse the rotation of said motor and the movable element of the pump which is secured to said driven shaft to thereby reverse the rotation of said driven shaft, said fluid motor being responsive to the pressure of the fluid at the outlet of said pump, spring means for assisting said fluid pressure developed by said pump to change said motor capacity, an engine arranged for driving said drive shaft, and vacuum means for said engine opposing said spring pressure for varying the capacity of the motor in accordance with the load on said engine.

4. In a variable ratio hydraulic transmission of the character described, a drive shaft, a driven shaft disposed in alignment relation to said drive shaft, a fixed capacity pump having an inlet and an outlet and comprising first and second relatively rotatable elements, one being secured to said drive shaft and the other secured to said driven shaft, a variable capacity fluid motor having first and second relatively movable elements disposed about said drive shaft and driven by the fluid pressure developed by said pump, means for varying the capacity of said motor to change the speed of said driven shaft relative to said drive shaft while varying the torque capacity thereof, a shiftable valve plate having spaced passageways therethrough for the passage of fluid delivered by said pump, said plate being disposed between said pump and motor and which in neutral position directs the passage of fluid from the high to the low side of said pump, means for shifting said plate to forward drive position to adjust the motor for driving directly through said shafts and for indirectly driving said shafts when the pump supplies fluid to said motor by the relative rotation of portions thereof to change the relative speed of the shafts, in one sense and the torque output thereof in the opposite sense, means for varying the capacity of said motor in response to the delivered pump pressure, and means for varying the capacity of the motor in the opposite sense in response to the speed of rotation of said motor.

5. In a variable ratio hydraulic transmission of the character described, a drive shaft, a driven shaft disposed in alignment relation to said drive shaft, a fixed capacity pump having an inlet and an outlet and comprising first and second relatively rotatable elements, one being secured to said drive shaft and the other secured to said driven shaft, a variable capacity fluid motor having first and second relatively movable elements disposed about said drive shaft and driven by the fluid pressure developed by said pump, means for varying the capacity of said motor to change the speed of said driven shaft relative to said drive shaft while varying the torque capacity thereof, a slidable valve plate having spaced passageways therethrough for the passage of fluid delivered by said pump, said plate being disposed between said pump and motor and which in neutral position directs the passage of fluid from the high to the low side of said pump, means for shifting said plate to forward drive position to adjust the motor for driving directly through said shafts and for indirectly driving said shafts when the pump supplies fluid to said motor by the relative rotation of portions thereof to change the relative speed of the shafts in one sense and the torque output thereof in the opposite sense, means for varying the capacity of said motor in response to the delivered pump pressure, means for varying the capacity of the motor in the opposite sense in response to the speed of rotation of said motor, and a spring for assisting the pump pressure to change the capacity of said motor.

6. In a variable ratio hydraulic transmission of the character described, a drive shaft, a driven shaft disposed in alignment relation to said drive shaft, a fixed capacity pump having an inlet and an outlet and comprising first and second relatively rotatable elements, one being secured to said drive shaft and the other secured to said driven shaft, a variable capacity fluid motor having first and second relatively movable elements disposed about said drive shaft and driven by the fluid pressure developed by said pump, means for varying the capacity of said motor to change the speed of said driven shaft relative to said drive shaft while varying the torque capacity thereof, a slidable valve plate having spaced passageways therethrough for the passage of fluid delivered by said pump, said plate being disposed between said pump and motor which in neutral position directs the passage of fluid from the high to the low side of said pump, means for shifting said plate to forward drive position to adjust the motor for driving directly through said shafts and for indirectly driving said shafts when the pump supplies fluid to said motor by the relative rotation of portions thereof to change the relative speed of the shafts in one sense and the torque output thereof in the opposite sense, means for varying the capacity of said motor in response to the delivered pump pressure, means for varying the capacity of the motor in the opposite sense in response to the speed of rotation of said motor, a spring for assisting the pump pressure to change the capacity of said motor, and an engine for operating said driven shaft providing a supply of vacuum, said vacuum being connected to said means for varying the capacity of the motor in response to the load on the engine.

References Cited in the file of this patent

UNITED STATES PATENTS

| | | |
|---|---|---|
| 1,840,864 | Rayburn et al. | Jan. 12, 1932 |
| 1,840,869 | Rayburn | Jan. 12, 1932 |
| 1,840,876 | Rayburn | Jan. 12, 1932 |
| 2,114,076 | Gölz | Apr. 12, 1938 |
| 2,190,122 | Mohler | Feb. 13, 1940 |
| 2,389,186 | Dodge | Nov. 20, 1945 |
| 2,547,578 | Holmes | Apr. 3, 1951 |
| 2,629,332 | Tripp | Feb. 24, 1953 |
| 2,706,384 | Schott | Apr. 19, 1955 |